United States Patent
Tuononen et al.

(10) Patent No.: US 12,253,375 B2
(45) Date of Patent: Mar. 18, 2025

(54) DETERMINING AND USING PATH SPECIFIC ROLLING RESISTANCE DATA FOR CONTROLLING VEHICLES

(71) Applicant: The Goodyear Tire & Rubber Company, Akron, OH (US)

(72) Inventors: Ari Tuononen, Espoo (FI); Arto Niskanen, Espoo (FI); Mikko Syrjälahti, Espoo (FI)

(73) Assignee: The Goodyear Tire & Rubber Company, Akron, OH (US)

( * ) Notice: Subject to any disclaimer, the term of this patent is extended or adjusted under 35 U.S.C. 154(b) by 232 days.

(21) Appl. No.: 17/795,672

(22) PCT Filed: Jan. 22, 2021

(86) PCT No.: PCT/FI2021/050043
§ 371 (c)(1),
(2) Date: Jul. 27, 2022

(87) PCT Pub. No.: WO2021/156537
PCT Pub. Date: Aug. 12, 2021

(65) Prior Publication Data
US 2023/0087155 A1    Mar. 23, 2023

(30) Foreign Application Priority Data
Feb. 4, 2020 (FI) ..................... 20205114

(51) Int. Cl.
*G01C 21/34* (2006.01)
*G01C 21/00* (2006.01)
(52) U.S. Cl.
CPC ..... *G01C 21/3469* (2013.01); *G01C 21/3815* (2020.08)

(58) Field of Classification Search
CPC ................................... G01C 21/3469
(Continued)

(56) References Cited

U.S. PATENT DOCUMENTS

| 2013/0046466 | A1* | 2/2013 | Yucel ................. G01C 21/3469 701/538 |
| 2015/0039178 | A1* | 2/2015 | Ishii ...................... B60W 40/10 701/32.5 |

(Continued)

FOREIGN PATENT DOCUMENTS

| EP | 2221581 A1 | 8/2010 |
| EP | 3466788 A1 | 4/2019 |

(Continued)

OTHER PUBLICATIONS

Finnish Patent and Registration Office, Search Report, Application No. 20205114, Mailed Sep. 3, 2020, 2 pages.

(Continued)

*Primary Examiner* — Nathaniel T Woodward
(74) *Attorney, Agent, or Firm* — Edward T. Kennedy

(57) ABSTRACT

Path specific rolling resistance is determined in a method including: receiving, from a first source, first rolling resistance data of a first set of road surface portions of a corresponding first set of times; receiving, from a second source, second rolling resistance data of a second set of road surface portions of a corresponding second set of times; determining, using any of the first rolling resistance data and the second rolling resistance data, a path specific rolling resistance for a given path including one or more of the road surface portions selected from the first and second set of road surface portions; and providing at least one target vehicle with the path specific rolling resistance or a derivative of the path specific rolling resistance.

17 Claims, 3 Drawing Sheets

(58) Field of Classification Search
USPC .......................................................... 701/423
See application file for complete search history.

(56) References Cited

U.S. PATENT DOCUMENTS

| | | |
|---|---|---|
| 2017/0293812 A1 | 10/2017 | Itoh et al. |
| 2018/0066958 A1 | 3/2018 | Choi et al. |
| 2019/0219412 A1 | 7/2019 | Melatti et al. |
| 2019/0283589 A1 | 9/2019 | Koebler et al. |
| 2019/0294173 A1* | 9/2019 | Szubbocsev ......... G05D 1/0274 |
| 2019/0376811 A1 | 12/2019 | Chowdhury et al. |

FOREIGN PATENT DOCUMENTS

| | | |
|---|---|---|
| EP | 3514579 A1 | 7/2019 |
| JP | 2018025856 A | 2/2018 |
| WO | 2019035300 A1 | 2/2019 |

OTHER PUBLICATIONS

Notification of Transmittal of The International Search Report and The Written Opinion of The International Searching Authority, or The Declaration, Application No. PCT/FI2021/050043, Mailed Apr. 19, 2021, 7 pages.

Written Opinion of The International Searching Authority, Application No. PCT/FI2021/050043, Mailed Apr. 19, 2021, 10 pages.

* cited by examiner

Fig. 4a    400

402. receiving, from a first source, first rolling resistance data of a first set of road surface portions on which the first vehicle has traveled at a corresponding first set of times 404. receiving second rolling resistance data of a second set of road surface portions on which the second vehicle has traveled at a corresponding second set of times 406. determining, using any of the first rolling resistance data and the second rolling resistance data, a path specific rolling resistance for a given path comprising one or more of the road surface portions selected from the first and second set of road surface portions 408. providing at least one third vehicle with the path specific rolling resistance or a derivative of the path specific rolling resistance.

410. obtaining the measurement data using electromagnetic radiation 412. obtaining the optical measurement data using infrared light 414. taking into account a reflectivity spectrum of the road surface in using an optical measurement data for compensating color-based effect on optical absorption 416. determining the wetness or water film thickness of the road surface based on weather monitoring or forecast data 418. optically determining the wetness or water film thickness of the road surface 420. producing two or more path specific rolling resistances for same path such that the path specific rolling resistances differ by their specificity, such as some being directed for a specific vehicle model and some being generic to any vehicles or some vehicle types (A)

Fig. 4b   400   (A)

| 422. directing route choices of at least one vehicle using the path specific rolling resistance for reducing energy consumption of traffic |
|---|
| 424. directing travel planning of at least one vehicle using the path specific rolling resistance by determining one or more target speeds for the path based on the path specific rolling resistance for reducing energy consumption of traffic |

Fig. 5   500

| 502. determining road surface data of a plurality of road surface portions at a vehicle traveling by the road surface portions |
|---|
| 504. providing a rolling resistance data distributor or another vehicle with rolling resistance information based on the determined road surface data |
| 506. determining by the optical sensor road surface data by photographing road surface and/or by measuring gloss or color of the road surface |
| 508. measuring by the infrared sensor reflection of one or more different infrared bands from the road surface |
| 510. measuring by the acceleration sensor vibration induced in a tire; wheel; or wheel suspension |
| 512. measuring by the acceleration sensor speed of a wheel for determination of brake locking events |
| 514. measuring brake fluid pressure to indicate braking force at times of brake locking events |

Fig. 6   600

| 602. receiving at a vehicle rolling resistance information for a route or a portion of a route to be travelled by the vehicle |
|---|
| 604. using the rolling resistance information to display an estimated range or to route the vehicle using the rolling resistance information so as to reduce energy required to reach a destination |

DETERMINING AND USING PATH SPECIFIC ROLLING RESISTANCE DATA FOR CONTROLLING VEHICLES

TECHNICAL FIELD

The aspects of the disclosed embodiments generally relates to road surface quality estimation for road vehicles.

BACKGROUND ART

This section illustrates useful background information without admission of any technique described herein representative of the state of the art.

Road surface may be monitored for weather, physical, chemical and mechanical conditions, such as moisture, ice, snow, temperature, humidity, salt and/or roughness.

Information related to weather and mechanical conditions may be used for road maintenance, autonomous driving, weather services and for other purposes. Road surface monitoring may be done using fixed monitoring stations, for example using sensors and cameras viewing the road from the side of the road and/or sensors embedded into the road.

Road surface monitoring may help to detect and reduce risks in traffic by more rapidly identifying accumulation of snow, forming of dangerously deep tracks into ice-coated road surface or forming of puddles. Some of the weather-related traffic risks may be mitigated by maintenance such as ploughing snow or applying salt to melt accrued ice. Also warnings may be presented or speed limits adjusted to changing conditions of roads, thanks to the monitoring of road surfaces.

SUMMARY

The appended claims define the scope of protection. Any examples and technical descriptions of apparatuses, products and/or methods in the description and/or drawings not covered by the claims are presented not as embodiments of the present disclosure but as background art or examples useful for understanding the disclosed embodiments.

According to a first example aspect of the disclosed embodiments there is provided a method for determining path specific rolling resistance, comprising:
receiving, from a first source, first rolling resistance data of a first set of road surface portions of a corresponding first set of times;
receiving second rolling resistance data of a second set of road surface portions of a corresponding second set of times;
determining, using any of the first rolling resistance data and the second rolling resistance data, a path specific rolling resistance for a given path comprising one or more of the road surface portions selected from the first and second set of road surface portions; and
providing at least one target vehicle with the path specific rolling resistance or a derivative of the path specific rolling resistance.

The second rolling resistance data may be received from a second source. Alternatively, or additionally, some or all of the second rolling resistance data may be received from the first source.

The first source may comprise a first vehicle. The first rolling resistance data may correspond to road surface portions on which the first vehicle has traveled at the first set of times. The first source may comprise a weather station. The first source may comprise a monitoring station. The monitoring station may be a fixed monitoring station.

The second source may comprise a second vehicle. The second rolling resistance data may correspond to road surface portions on which the second vehicle has traveled at the second set of times. The second source may comprise a weather station. The second source may comprise a monitoring station. The monitoring station may be a fixed monitoring station.

The rolling resistance data may comprise measurement data suitable for determining rolling resistance. The measurement data may be obtained using electromagnetic radiation. The measurement data may comprise optical measurement data. The optical measurement data may be obtained using infrared light. The measurement data may be obtained using two different bands of electromagnetic radiation. The optical measurement data may be obtained using three different bands of electromagnetic radiation. The optical measurement data may comprise an indication of a reflectivity spectrum of the road surface. The measurement data may comprise anti-locking brake, traction control or stability control sensor data.

The method may further comprise taking into account a reflectivity spectrum of the road surface in using optical measurement data for compensating color-based effect on optical absorption. The term color may refer to an optical spectrum ranging from 400 to 2500 nm.

Alternatively or additionally, the rolling resistance data may comprise determined rolling resistance. The determined rolling resistance may be determined using any one or more of: detected drive power; speed; wind speed; wind direction; road surface material; road surface condition; tire pressure; tire temperature; orientation of road surface; wetness of the road surface; color of the road surface; thickness of water layer on the road; thickness of snow layer on the road; thickness of sand layer on the road; quality of snow layer on the road; quality of sand layer on the road; and one or more tire properties.

The wetness and/or water film thickness of the road surface may be determined based on weather monitoring or forecast data. The wetness and/or water film thickness of the road surface may be optically determined. The wetness of the road surface may be optically determined based on a color of the road surface. The wetness of the road surface may be optically determined based on current color of the road and earlier color observations of the road. The wetness of the road surface may be estimated from road weather station measurements or weather forecast. The wetness of the road surface can be estimated from any one or more of: operation of windshield wipers; use of headlights; fog lights being active.

The rolling resistance may be estimated using the measurement data.

The first set of road surface portions may comprise portions of two or more different roads. The first set of road surface portions may comprise sideways different portions of same road, such as lanes or different lateral parts of one lane. Road surface portions may also refer to the surface of given stretches of one or more roads.

The first set of times may comprise one or more series of times. Within one series, the times may have equal or differing intervals. The first set of times may correspond to times at which particular changes have been detected in rolling resistance determined at the first source.

The second set of times may comprise one or more series of times. Within one series, the times may have equal or differing intervals. The second set of times may correspond to times at which particular changes have been detected in rolling resistance determined at the second source.

In context of this document, the term "road" may also mean a street. In context of this document, the term "road" may also mean a highway.

The determining of the path specific rolling resistance for a given path may be based on such data concerning the road surface portions for which the data were produced with a different timing meeting a temporal closeness criterion. The temporal closeness criterion may depend on road or air temperature at the road surface portions or proximate measurement station. The temporal closeness criterion may be set such that at likelihood of at least 95%, an error not greater than 10%, 20%, 40% or 50% is induced.

The providing of at least one target vehicle with the path specific rolling resistance may be automatically performed. The providing of at least one target vehicle with the path specific rolling resistance may be automatically performed based on location data indicating locations of a plurality of vehicles such that providing redundant data is avoided. Alternatively, the providing of at least one target vehicle with the path specific rolling resistance may be performed responsive to a request received from the at least one vehicle.

The path specific rolling resistance may be specific to a given vehicle, vehicle type, or vehicle model. Alternatively, the path specific rolling resistance may be generically applicable for different vehicles, vehicle types, or vehicle models.

The method may further comprise producing two or more path specific rolling resistances for same path such that the path specific rolling resistances differ by their specificity, such as some being directed for a specific vehicle model and some being generic to any vehicles or some vehicle types.

The derivative of the path specific rolling resistance may comprise a range impact estimate. The range impact estimate may estimate relative energy consumption of energy storage of the vehicle. In case of electric vehicles, the relative energy consumption may estimate percentage of battery capacity draw caused by traveling through the path. The range impact estimate may estimate absolute energy consumption of the vehicle caused by traveling through the path. The range impact estimate may comprise estimated range of the vehicle with its current battery charge or fuel level.

The method may further comprise directing travel planning of at least one vehicle using the path specific rolling resistance for reducing energy consumption of traffic.

The method may further comprise directing route choices of at least one vehicle using the path specific rolling resistance for reducing energy consumption of traffic.

The method may further comprise directing travel planning of at least one vehicle using the path specific rolling resistance by determining one or more target speeds for the path based on the path specific rolling resistance for reducing energy consumption of traffic. The target speed may be adapted to different segments of the path taking into account nonlinear power loss caused by rolling resistance. The target speed may be adapted to different segments of the path taking into account nonlinear power loss caused by air drag.

The at least one target vehicle may comprise the first vehicle. The first vehicle may be a different vehicle than any of the at least one target vehicle. The at least one target vehicle may comprise the second vehicle. The first vehicle may be a different vehicle than any of the at least one second vehicle. The first vehicle may be the second vehicle. The first vehicle may be a different vehicle than the second vehicle.

Any of the vehicles may be selected from a group consisting of: a car; a motorbike; a lorry; a truck; a bus. Any of the vehicles may be an electric vehicle. The electric vehicle may be a battery operated vehicle. The electric vehicle may be operated by a fuel cell such as a hydrogen fuel cell.

According to a second example aspect of the disclosed embodiments there is provided a method for obtaining rolling resistance data enabling path specific rolling resistance determination, the method comprising:
  determining road surface data of a plurality of road surface portions at a vehicle traveling by the road surface portions; and
  providing a rolling resistance data distributor or another vehicle with rolling resistance information based on the determined road surface data.

The road surface data may be determined using one or more sensors at the vehicle. The one or more sensors may comprise an optical sensor. The one or more sensors may comprise an infrared sensor. The one or more sensors may comprise an acceleration sensor. The one or more sensors may comprise an ultrasonic sensor. The one or more sensors may comprise a brake fluid pressure sensor. The one or more sensors may comprise a tire pressure sensor. The one or more sensors may comprise a tire temperature sensor. The one or more sensors may comprise an ambient air temperature sensor. The one or more sensors may comprise an inclination sensor. The one or more sensors may be configured to perform indirect or direct air drag sensing. The one or more sensors may comprise a power sensor configured to measure power transmitted to wheels of the vehicle.

The optical sensor may be configured to determine road surface data by photographing road surface and/or by measuring gloss or color of the road surface.

The infrared sensor may measure reflection of one or more different infrared bands from the road surface.

The acceleration sensor may measure vibration induced in a tire; wheel; or wheel suspension.

The acceleration sensor may measure speed of a wheel for determination of brake locking events.

The brake fluid pressure sensor may be configured to indicate braking force at times of brake locking events.

The providing of the rolling resistance data distributor or another vehicle with rolling resistance information may comprise sending the rolling resistance information with a radio transmitter. The radio transmitter may be configured to use a public land mobile network such as W-CDMA or LTE. The radio transmitter may be configured to use a satellite radio. The radio transmitter may be configured to use a wireless local area radio transmission, such as wireless local area network transmission.

The providing of the rolling resistance data distributor or another vehicle with rolling resistance information may comprise collecting rolling resistance information for a plurality of road surface portions for batch transmission.

The rolling resistance information may comprise an estimated or measured rolling resistance. The rolling resistance information may comprise measurement and/or control information suited for determining rolling resistance.

According to a third example aspect of the disclosed embodiments there is provided a method for controlling a vehicle, comprising:
  receiving at a vehicle rolling resistance information for a route or a portion of a route to be travelled by the vehicle; and using the rolling resistance information to display an estimated range or to route the vehicle using the rolling resistance information so as to reduce energy required to reach a destination.

The routing of the vehicle so as to reduce energy required to reach the destination may comprise displaying a route determined using the rolling resistance information. The routing of the vehicle so as to reduce energy required to reach the destination may comprise autonomously driving the vehicle using the route.

The vehicle may be an electric vehicle. The electric vehicle may be battery operated.

According to a fourth example aspect of the disclosed embodiments there is provided an apparatus, comprising:
an input;
a processing functionality; and
an output;
the input, processing functionality and output functionality being configured to perform the method of any one of the first to third example aspect.

According to a fifth example aspect of the disclosed embodiments there is provided a computer program comprising computer executable program code which when executed by at least one processor causes an apparatus at least to perform the method of any one of the first to third example aspect.

According to a sixth example aspect of the disclosed embodiments there is provided a computer program product comprising a non-transitory computer readable medium having the computer program of the fifth example aspect stored thereon.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a seventh example aspect there is provided a system comprising at least two items selected from the following:
one more apparatuses of the fourth example aspect (optionally performing different ones of the methods);
one or more computer programs of the fifth example aspect (optionally configured to cause performing different ones of the methods);
one or more computer program products of the sixth example aspect (optionally configured to cause performing different ones of the methods).

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present disclosed embodiments have been illustrated in the foregoing. The embodiments in the foregoing are used merely to explain selected aspects or steps that may be utilized in implementations of the present disclosed embodiments. Some embodiments may be presented only with reference to certain example aspects of the disclosed embodiments. It should be appreciated that corresponding embodiments may apply to other example aspects as well.

BRIEF DESCRIPTION OF THE DRAWINGS

Some example embodiments of the present disclosure will be described with reference to the accompanying drawings, in which:

FIGS. 4a and b show a flow chart of a first process to an example embodiment of the present disclosure;

FIG. 5 shows a flow chart of a second process to an example embodiment of the present disclosure; and FIG. 6 shows a flow chart of a third process to an example embodiment of the present disclosure.

DETAILED DESCRIPTION

In the following description, like reference signs denote like elements or steps.

Figure 1:
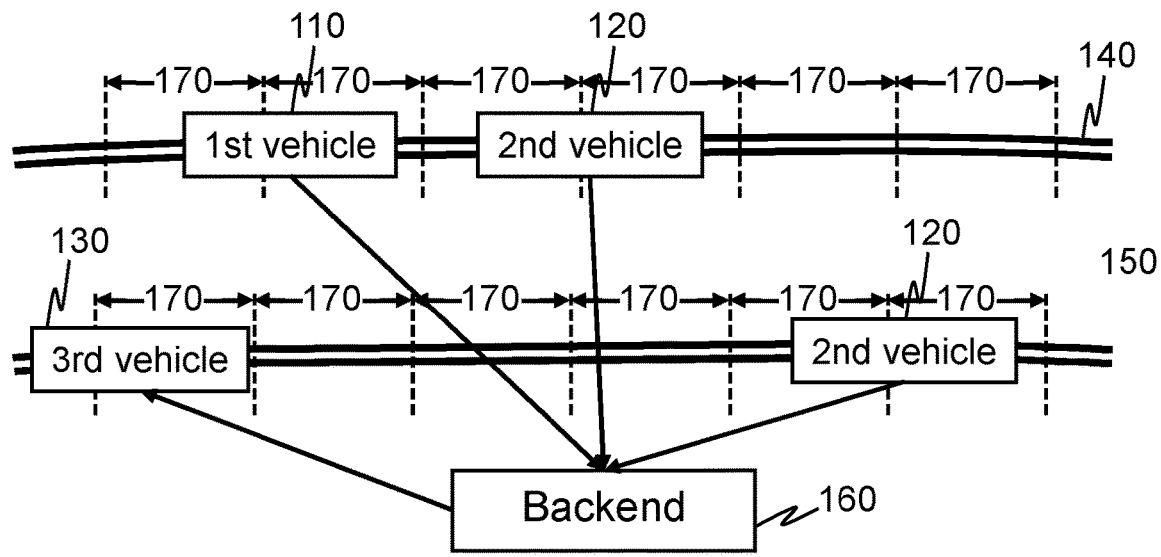
FIG. 1 shows a schematic drawing of a system according to an example embodiment of the present disclosure.

FIG. 1 shows a schematic drawing of a system 100 according to an example embodiment of the present disclosure. The system comprises a first vehicle 110, a second vehicle 120, a third vehicle 130, a plurality of roads including a first road 140 and a second road 150 extending between points A and B, and a backend 160.

The first vehicle 110 and the second vehicle 120 may be similar or even identical but here differentiated to facilitate discussion of some embodiment. Likewise, the third vehicle 130 may be similar or identical with either or both of the first and second vehicles 110, 120.

The first and second roads 140, 150 may comprise multiple lane portions (such as dual carriage lanes or motorways). The surface of the roads need not remain consistent. Each road is understood as being formed of a plurality of road portions 170. For some embodiments, these road portions need not be adjacent. Instead, longer segments of road surface may be interpolated and/or extrapolated based on determined surface quality of the road portions 170.

FIG. 1 further shows first rolling resistance data 112 being transferred from the first vehicles 110 to the backend 160, second rolling resistance data 122 being transferred from the second vehicles 120 to the backend 160 and path specific rolling resistance data being transferred from the backend 160 to the third vehicle 130. FIG. 1 schematically shows these data as if they were concurrently transferred, which need not be the case. Unidirectional arrows merely illustrate the direction of these data.

The road portions may be arbitrary portions of the road that just happen to be subjected to determining road surface data. Alternatively, the road portions may be (optionally predetermined and) same for a plurality of vehicles. Yet further, some of the vehicles may employ the predetermined and same road portions while some other vehicles employ other parts of the road.

The backend 160 may be formed using one or more servers. In another embodiment, the backend 160 is formed using a virtualized server. In yet another embodiment, the backend 160 is formed using cloud computing.

FIG. 1 further shows a fixed monitoring station 180. Depending on implementation, the fixed monitoring station 180 can be configured to monitor one or more of the road portions 170. For example, the fixed monitoring station can be implemented using a camera that captures image data of an area partly or entirely covering one or more of the road portions 170 of one or more roads 140, 150. The fixed monitoring station may also be or alternatively comprise any one or more of: a rain sensor; a wind sensor; a thermometer; a barometer; a humidity sensor; a rain radar.

In case that some road portion is a given length or stretch of a lane or of a road, the length of the road portion is in an example at least one of the following number of meters: 1; 2; 5; 10; 15; 20; 30; 50; 100; 1 000; 10 000.

In the case that some road portion is a given length or stretch of a lane or of a road, the length of the road portion is in an example at most one of the following number of meters: 2; 5; 10; 15; 20; 30; 50; 100; 1 000; 10 000; 15 000.

In an embodiment, the road portion has a length of 2 to 50 meters or 5 to 15 meters.

Figure 2:
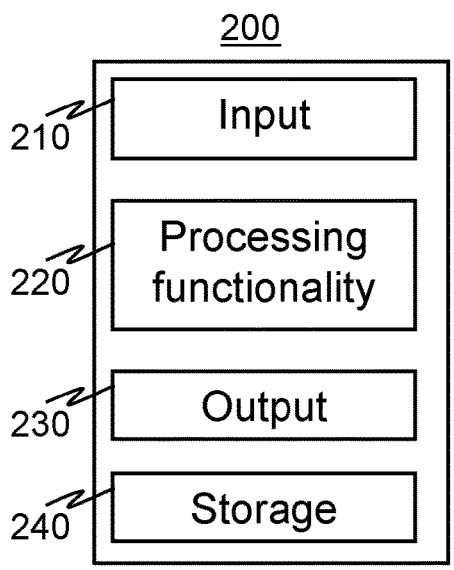
FIG. 2 shows a block diagram of a server according to an example embodiment of the present disclosure.

FIG. 2 shows a block diagram of a server apparatus 200 configured to operate as the backed 160. The server apparatus 200 comprises an input 210 such as a hardware input or a logical input function; a processing functionality 220 such as at least one processor or shared cloud computing resources; and an output 230 such as a hardware output or a logical output function.

The server apparatus 200 may further comprise a storage 240 for maintaining received data and/or data derived by the server. The storage may be co-located with the server or distributed to be operated by one or more remote equipment.

Figure 3:
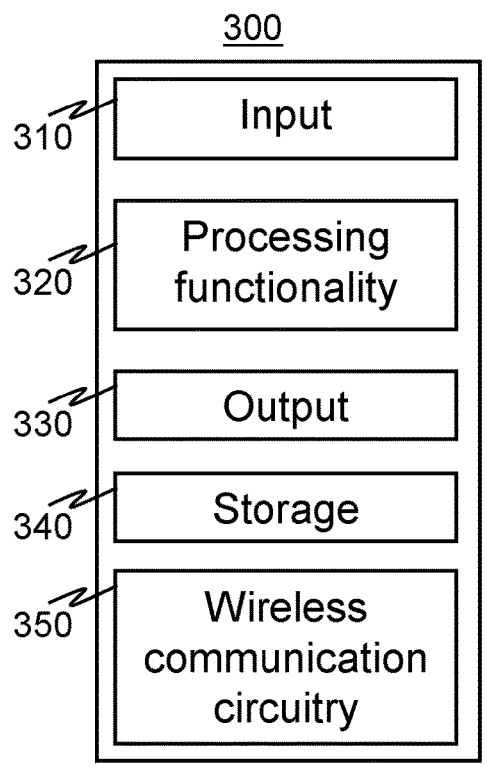
FIG. 3 shows a block diagram of a vehicle apparatus according to an example embodiment of the present disclosure.

FIG. 3 shows a block diagram of a vehicle apparatus 300 for controlling some operations of any one of the vehicles of FIG. 1. The vehicle apparatus 300 may be an add-on device to be added to a vehicle. Alternatively, the vehicle apparatus 300 may use for some or all of its circuitries existing equipment of the vehicle.

The vehicle apparatus 300 comprises an input 310 such as a hardware input or a logical input function; a processing functionality 320 such as at least one processor or shared cloud computing resources; and an output 330 such as a hardware output or a logical output function. Additionally, the vehicle apparatus 300 may further comprise a storage 340 for maintaining received or generated data.

Any processor referred to by this document may be or comprise a master control unit. Alternatively, the processor may be or comprise a microprocessor, a digital signal processor, an application specific integrated circuit, a field programmable gate array, a microcontroller or a combination of such elements.

The vehicle apparatus 300 may further comprise a wireless communication circuitry 350 such as a cellular communication circuitry; satellite communication circuitry; a short range communication circuitry such as a wireless local area network communication network circuitry; or any combination thereof.

FIGS. 4a and b show a flow chart of a first process 400 illustrating some steps of particular embodiments. All these steps need not be performed. In some embodiments, some steps are performed more than once. Further steps may also be performed.

The first process may be performed by the backend 160 for determining path specific rolling resistance.

The first process 400 comprises:
402. receiving, from a first source, such as a first vehicle, first rolling resistance data of a first set of road surface portions (e.g., on which the first vehicle has traveled) of a corresponding first set of times;
404. receiving, e.g., from a second source, such as a second vehicle, second rolling resistance data of a second set of road surface portions (e.g., on which the second vehicle has traveled) of a corresponding second set of times;
406. determining, using any of the first rolling resistance data and the second rolling resistance data, a path specific rolling resistance for a given path comprising one or more of the road surface portions selected from the first and second set of road surface portions;
408. providing at least one target vehicle with the path specific rolling resistance or a derivative of the path specific rolling resistance.

As mentioned in the foregoing the first source may be a first vehicle. The first source may also comprise other elements, such as any of: a weather station; a monitoring station; a fixed monitoring station.

As mentioned in the foregoing the second source may be a second vehicle. The second source may also comprise other elements, such as any of: a weather station; a monitoring station; a fixed monitoring station.

In an example embodiment, the rolling resistance data comprises measurement data suitable for determining rolling resistance. In an example embodiment, method further comprises 410. obtaining the measurement data using electromagnetic radiation. In an example embodiment, the measurement data comprises optical measurement data.

In an example embodiment, the optical measurement data is obtained using two different bands of electromagnetic radiation. In an example embodiment, the measurement data is obtained using three different bands of the electromagnetic radiation. In an example embodiment, the measurement data comprises an indication of a reflectivity spectrum of the road surface.

In an example embodiment, the first process 400 further comprises:
412. obtaining the optical measurement data using infrared light. The optical measurement data may be obtained using two different bands of infrared light. In an example embodiment, the optical measurement data is obtained using three different bands of infrared light. In an example embodiment, the optical measurement data comprises an indication of a color of the road surface.

In an example embodiment, the measurement data comprises of any of: an anti-locking brake system; a traction control system; electronic stability control system.

In an example embodiment, the first process 400 further comprises:
414. taking into account a reflectivity spectrum of the road surface in using an optical measurement data for compensating color-based effect on optical absorption. In an example embodiment, the term color refers to an optical spectrum ranging from 400 to 2500 nm.

In an example embodiment, the rolling resistance data comprises determined rolling resistance. The determined rolling resistance may be determined using any one or more of: detected drive power; speed; wind speed; wind direction; road surface material; road surface condition; tire pressure; tire temperature; orientation of road surface; wetness of the road surface; color of the road surface; thickness of water layer on the road; thickness of snow layer on the road; thickness of sand layer on the road; quality of snow layer on the road; quality of sand layer on the road; and one or more tire properties.

In an example embodiment, the first process 400 may further comprise:
- 416. determining the wetness and/or water film thickness of the road surface based on weather monitoring or forecast data (e.g., using a weather forecast supplier);
- 418. optically determining the wetness or water film thickness of the road surface.

In an example embodiment, this determining is performed optically based on a color of the road surface. The wetness of the road surface may be optically determined based on current color of the road and earlier color observations of the road.

In an example embodiment, the wetness of the road surface is estimated from road weather station measurements or weather forecast. In an example embodiment, the wetness of the road surface is estimated from any one or more of: operation of windshield wipers; use of headlights; fog lights being active.

In an example embodiment, the first set of road surface portions may comprise portions of two or more different roads. The first set of road surface portions may comprise sideways different portions of same road, such as lanes or different lateral parts of one lane.

In an example embodiment, the first set of road surface portions relates to at least 10; 20; 50; or 100 road surface portions. Some or all of the road surface portions may be contiguous. Some or all of the road surface portions may be non-contiguous.

In an example embodiment, the first set of times comprises one or more series of times. Within one series, the times may have equal or differing intervals. In an example embodiment, the first set of times corresponds to times at which particular changes have been detected in rolling resistance determined at the first vehicle. In another embodiment, the first set of times comprises one or more times, e.g., for respective one or more groups.

In an example embodiment, the second set of times comprises one or more series of times. Within one series, the times may have equal or differing intervals. In an example embodiment, the second set of times corresponds to times at which particular changes have been detected in rolling resistance determined at the second vehicle. Some or all of the intervals may be contiguous. Some or all of the intervals may be non-contiguous. In another embodiment, the first set of times comprises one or more times, e.g., for respective one or more groups.

In an example embodiment, the determining of the path specific rolling resistance for a given path is based on such data concerning the road surface portions for which the data were produced with a different timing meeting a temporal closeness criterion. In an example embodiment, the temporal closeness criterion depends on road or air temperature at the road surface portions or proximate measurement station. In an example embodiment, the temporal closeness criterion is set such that at likelihood of at least 95%, an error not greater than 10%, 20%, 40% or 50% is induced.

In an example embodiment, the providing of at least one third vehicle with the path specific rolling resistance is automatically performed. In an example embodiment, the providing of at least one third vehicle with the path specific rolling resistance is automatically performed based on location data indicating locations of a plurality of vehicles such that providing redundant data is avoided.

In an example embodiment, the providing of at least one third vehicle with the path specific rolling resistance is performed responsive to a request received from the at least one vehicle.

In an example embodiment, the path specific rolling resistance is specific to a given vehicle, vehicle type, or vehicle model.

In an example embodiment, the path specific rolling resistance is generically applicable for different vehicles, vehicle types, or vehicle models.

In an example embodiment, the first process 400 further comprises:
- 420. producing two or more path specific rolling resistances for same path such that the path specific rolling resistances differ by their specificity, such as some being directed for a specific vehicle model and some being generic to any vehicles or some vehicle types.

In an example embodiment, the derivative of the path specific rolling resistance comprises a range impact estimate. The range impact estimate may estimate relative energy consumption of energy storage of the vehicle. In case of electric vehicles, the relative energy consumption may estimate percentage of battery capacity draw caused by traveling through the path. In an example embodiment, the range impact estimate estimates absolute energy consumption of the vehicle caused by traveling through the path. In an example embodiment, the range impact estimate comprises estimated range of the vehicle with its current battery charge or fuel level.

In an example embodiment, the first process 400 further comprises:
- 422. directing travel planning of at least one vehicle using the path specific rolling resistance for reducing energy consumption of traffic.

In an example embodiment, the first process 400 further comprises:
- 424. directing route choices of at least one vehicle using the path specific rolling resistance for reducing energy consumption of traffic.

In an example embodiment, the first process 400 further comprise:
- 426. directing travel planning of at least one vehicle using the path specific rolling resistance by determining one or more target speeds for the path based on the path specific rolling resistance for reducing energy consumption of traffic. In an example embodiment, the target speed is adapted to different segments of the path taking into account nonlinear power loss caused by rolling resistance. In an example embodiment, the target speed is adapted to different segments of the path taking into account nonlinear power loss caused by air drag.

In an example embodiment, the at least one third vehicle comprises the first vehicle. In an example embodiment, the first vehicle is a different vehicle than any of the at least one third vehicle. In an example embodiment, the at least one third vehicle comprises the second vehicle. In an example embodiment, the first vehicle is a different vehicle than any of the at least one second vehicle. In an example embodiment, the first vehicle is the second vehicle. In an example embodiment, the first vehicle is a different vehicle than the second vehicle.

In an example embodiment, any of the vehicles is selected from a group consisting of: a car; a motorbike; a lorry; a truck; a bus. In an example embodiment, any of the vehicles may be an electric vehicle. In an example embodiment, the electric vehicle is a battery operated vehicle. In an example embodiment, the electric vehicle is operated by a fuel cell such as a hydrogen fuel cell.

In an example embodiment, reliability or suitability of received data is estimated. If estimated to be insufficiently reliable or suitable for providing a given target vehicle with the path specific resistance or its derivative (such as a range estimate), such received data can be neglected or the weighed lower on combining with other received data.

FIG. 5 shows a flow chart of a second process 500 illustrating some steps of particular embodiments. All these steps need not be performed. In some embodiments, some steps are performed more than once. Further steps may also be performed.

In an example embodiment, the second process 500 is performed by the vehicle apparatus 300 for obtaining rolling resistance data enabling path specific rolling resistance determination.

In an example embodiment, the second process 500 comprises:
- 502. determining road surface data of a plurality of road surface portions at a vehicle traveling by the road surface portions; and
- 504. providing a rolling resistance data distributor or another vehicle with rolling resistance information based on the determined road surface data.

In an example embodiment, the road surface data may be determined using one or more sensors at the vehicle. In an example embodiment, the one or more sensors comprise an electromagnetic sensor. In an example embodiment, the one or more sensors comprise an optical sensor. In an example embodiment, the one or more sensors comprise an infrared sensor. In an example embodiment, the one or more sensors comprise an acceleration sensor. In an example embodiment, the one or more sensors comprise an ultrasonic sensor. In an example embodiment, the one or more sensors comprise a brake fluid pressure sensor. In an example embodiment, the one or more sensors comprise a tire pressure sensor. In an example embodiment, the one or more sensors comprise a tire temperature sensor. In an example embodiment, the one or more sensors comprise an ambient air temperature sensor. In an example embodiment, the one or more sensors comprise an inclination sensor. In an example embodiment, the one or more sensors comprise an air resistance sensor. In an example embodiment, the one or more sensors comprise a power sensor configured to measure power transmitted to wheels of the vehicle.

In an example embodiment, the second process 500 comprises:
- 506. determining by the optical sensor road surface data by photographing road surface and/or by measuring gloss or color of the road surface;
- 508. measuring by the infrared sensor reflection of one or more different infrared bands from the road surface;
- 510. measuring by the acceleration sensor vibration induced in a tire; wheel; or wheel suspension;
- 512. measuring by the acceleration sensor speed of a wheel for determination of brake locking events; and
- 514. measuring brake fluid pressure to indicate braking force at times of brake locking events.

The providing of the rolling resistance data distributor or another vehicle with rolling resistance information comprises in an example embodiment 516. sending the rolling resistance information with a radio transmitter. The radio transmitter can be configured to use a public land mobile network such as W-CDMA or LTE; a satellite radio; a wireless local area radio transmission, such as wireless local area network transmission; or any combination thereof.

The providing of the rolling resistance data distributor or another vehicle with rolling resistance information comprises in an example embodiment 518. collecting rolling resistance information for a plurality of road surface portions for batch transmission.

The rolling resistance information comprises in an example embodiment an estimated or measured rolling resistance. The rolling resistance information may comprise measurement and/or control information suited for determining rolling resistance.

FIG. 6 shows a flow chart of a third process 600 illustrating some steps of particular embodiments. All these steps need not be performed. In some example embodiments, some steps are performed more than once. Further steps may also be performed.

In an example embodiment, the third process 600 is performed by the vehicle apparatus 300 for controlling a vehicle.

In an example embodiment, the third process 600 comprises:
- 602. receiving at a vehicle rolling resistance information for a route or a portion of a route to be travelled by the vehicle; and
- 604. using the rolling resistance information to display an estimated range or to route the vehicle using the rolling resistance information so as to reduce energy required to reach a destination.

In an example embodiment, the routing of the vehicle so as to reduce energy required to reach the destination comprises 606. displaying a route determined using the rolling resistance information. In an example embodiment, the routing of the vehicle so as to reduce energy required to reach the destination comprises 608. autonomously driving the vehicle using the route.

In an example embodiment, the vehicle is an electric vehicle. The electric vehicle may be battery operated.

Various embodiments have been presented. It should be appreciated that in this document, words comprise, include and contain are each used as open-ended expressions with no intended exclusivity.

The foregoing description has provided by way of non-limiting examples of particular implementations and embodiments of the present disclosure a full and informative description of the best mode presently contemplated by the inventors for carrying out the disclosed embodiments. It is however clear to a person skilled in the art that the disclosed embodiments is not restricted to details of the embodiments presented in the foregoing, but that it can be implemented in other embodiments using equivalent means or in different combinations of embodiments without deviating from the characteristics of the present disclosure. For example, the receiving of the rolling resistance data may be performed by obtaining data from a different memory register or different memory address without concurrent or real-time data transfer.

Furthermore, some of the features of the afore-disclosed embodiments of this present disclosure may be used to advantage without the corresponding use of other features. As such, the foregoing description shall be considered as merely illustrative of the principles of the present disclosure, and not in limitation thereof. Hence, the scope of the disclosed embodiments is only restricted by the appended patent claims.

The invention claimed is:

1. A method for determining path specific rolling resistance, comprising:
   receiving, from a first source, first rolling resistance data of a first set of more than one road surface portions of a corresponding first set of times;
   receiving, from a second source, second rolling resistance data of a second set of more than one road surface portions of a corresponding second set of times;
   determining, using any of the first rolling resistance data and the second rolling resistance data, a path specific rolling resistance for a given path comprising more than one of the road surface portions selected from the first and second set of road surface portions;
   providing at least one target vehicle with the path specific rolling resistance or a derivative of the path specific rolling resistance; and
   directing route choices for the target vehicle using the rolling resistance information.

2. The method of claim 1, wherein the rolling resistance data comprises measurement data suitable for determining rolling resistance.

3. The method of claim 1, wherein:
   the first source comprises a first vehicle;
   the first rolling resistance data corresponds to road surface portions on which the first vehicle has traveled at the first set of times;
   the second source comprises a second vehicle; and
   the second rolling resistance data corresponds to road surface portions on which the first vehicle has traveled at the first set of times.

4. The method of claim 1, wherein the rolling resistance data comprises determined rolling resistance.

5. The method of claim 1, wherein the determining of the path specific rolling resistance further comprises taking into account the color of the road surface in using an infrared light based measurement data for compensating color-based effect on infrared light absorption.

6. The method of claim 5, wherein the rolling resistance data comprises measurement data suitable for determining rolling resistance.

7. The method of claim 5, wherein:
   the first source comprises a first vehicle;
   the first rolling resistance data corresponds to road surface portions on which the first vehicle has traveled at the first set of times;
   the second source comprises a second vehicle; and
   the second rolling resistance data corresponds to road surface portions on which the first vehicle has traveled at the first set of times.

8. The method of claim 5, wherein the first set of road surface portions comprises portions of two or more different roads.

9. The method of claim 1, wherein the first set of road surface portions comprises portions of two or more different roads.

10. The method of claim 1, wherein the determining of the path specific rolling resistance for a given path is based on such data concerning the road surface portions for which the data were produced with a different timing meeting a temporal closeness criterion.

11. The method of claim 10, wherein the rolling resistance data comprises measurement data suitable for determining rolling resistance.

12. The method of claim 10, wherein:
   the first source comprises a first vehicle;
   the first rolling resistance data corresponds to road surface portions on which the first vehicle has traveled at the first set of times;
   the second source comprises a second vehicle; and
   the second rolling resistance data corresponds to road surface portions on which the first vehicle has traveled at the first set of times.

13. The method of claim 10, wherein the first set of road surface portions comprises portions of two or more different roads.

14. The method of claim 1, wherein the derivative of the path specific rolling resistance comprises a range impact estimate.

15. The method of claim 1, wherein the method further comprises directing travel planning of at least one vehicle using the path specific rolling resistance for reducing energy consumption of traffic.

16. The method of claim 1, wherein the first source is a weather forecast supplier.

17. An apparatus, comprising:
   an input;
   a processing functionality; and
   an output;
   the input, processing functionality and output functionality being configured to perform the method of claim 1.

* * * * *